United States Patent [19]

Wisner et al.

[11] 4,001,665
[45] Jan. 4, 1977

[54] HIGH EFFICIENCY POWER SUPPLY HAVING A REACTIVE BUCK AUTOMATIC D.C. VOLTAGE REGULATOR

[75] Inventors: Daniel A. Wisner, Milan; Flavius A. Mathamel, Allen Park; Truman T. Schmalzriedt, Westland, all of Mich.

[73] Assignee: Burroughs Corporation, Detroit, Mich.

[22] Filed: Apr. 21, 1975

[21] Appl. No.: 569,673

[52] U.S. Cl. .................................. 321/18; 321/20; 323/45; 323/60
[51] Int. Cl.² .................... G05F 1/64; H02P 13/04
[58] Field of Search .................. 321/16, 18, 20, 25; 323/6, 45, 60, 61, 44 R

[56] References Cited

UNITED STATES PATENTS

| | | | |
|---|---|---|---|
| 3,371,263 | 2/1968 | Walz et al. | 321/25 |
| 3,469,179 | 9/1969 | Bassett, Jr. | 323/45 |
| 3,611,116 | 10/1971 | Balian et al. | 323/60 X |
| 3,739,255 | 6/1973 | Leppert | 321/18 |
| 3,824,449 | 7/1974 | Hase | 323/60 X |

Primary Examiner—Gerald Goldberg
Attorney, Agent, or Firm—Ronald L. Taylor; Charles P. Padgett, Jr.; Carl Fissell, Jr.

[57] ABSTRACT

D.C. power supply having a reactive buck automatic D.C. voltage regulator which directly controls the rectified D.C. output of a loosely coupled transformer thereby providing load regulation from an unregulated alternating current source. The load current passes through the secondary winding of an auxiliary buck transformer and is stepped down to a much lower value in the primary winding of the auxiliary buck transformer. The primary winding of the auxiliary buck transformer is coupled to an isolated winding on the core of a ferroresonant C.V.T. transformer which receives the unregulated alternating current input signal, and the coupling between the isolated winding and the primary winding of the buck transformer effects a bilateral energy transfer between the two transformers which effects a real time reactive compensation which regulates the D.C. output of the power supply for changes in the input voltage and in the load while conserving the energy which would normally be wasted in achieving regulation by transferring it back to the resonant circuit via the bilateral energy transfer between the two transformers. The control system is set up so that the auxiliary buck transformer is normally bucking under all line and load conditions when the frequency is precisely at the resonant frequency of the saturable inductor and capacitor. A frequency shift either above or below resonance simply changes the amount of bucking that takes place in a complimentary manner. It should be noted that little power is consumed during the buck process as the power is returned from the auxiliary buck transformer to the loosely coupled ferroresonant transformer. The operating point of a negative feedback system which determines the point about which the bilateral energy transfer occurs, may be fine-tuned by an error-sensing feedback circuit for altering the voltage level which the coupling network operates to hold constant by controlling the bilateral energy transfer. A capacitor is provided across the primary of the auxiliary buck transformer to reflect capacitance into the secondary winding during conditions of little or no bucking action in order to enhance the stability of the regulator.

19 Claims, 3 Drawing Figures

HIGH EFFICIENCY POWER SUPPLY HAVING A REACTIVE BUCK AUTOMATIC D.C. VOLTAGE REGULATOR

BACKGROUND OF THE INVENTION

This invention relates generally to a high efficiency regulator for a power supply and more particularly to a reactive buck automatic D.C. voltage regulator for controlling the rectified D.C. output of a loosely coupled transformer thereby providing load regulation from an unregulated alternating current source at maximum efficiency.

At an early date, power supplies were designed which converted an A.C. input signal into a rectified D.C. output. The need for regulating D.C. output under varying load and input conditions was immediately apparent for many applications. Many early attempts at regulation employed the use of a saturable reactor transformer having a well-defined saturation characteristic wherein the half cyclic average voltage induced in one winding on the saturable reactor was constant so long as the core was saturated and the frequency was fixed. This was true regardless of the magnitude of the waveform of the input voltage and regardless of the number of turns on the primary winding since, so long as the core was driven into saturation, the output voltage follows the number of turns on the secondary winding. If a rectifier and averaging filter were added to follow the output of the saturable reactor transformer, the D.C. output was regulated for line voltage changes, and this quickly became the most fundamental type of line voltage regulator.

A more efficient line voltage regulator employed the use of an inductor in series with the saturable reactor transformer to reduce power losses, and still a more efficient technique for regulating the output voltage was developed which employed the use of a capacitor placed in parallel with the saturable reactor such that the capacitor and the series inductor could be tuned near the input frequency. This arrangement provides an almost unity power factor and efficient power transfer. These circuits were called ferroresonant regulators and enjoyed an improved power factor, a better output waveform for rectification and filtering, and relative insensitivity to input voltage spikes. Ferroresonant regulators, however, have five major disadvantages: (1) the output voltage is frequency sensitive; (2) since the core operates in saturation, the core losses are high and the external magnetic field is high; (3) since the output varies directly with the cross sectional area of the core, normal core tolerances cause unit-to-unit output voltage differences; (4) since the core is the regulating element, the output voltage varies with load current changes due to voltage drops in the secondary resistance; and (5) since the magnetic materials used in ferroresonant regulators have a inherent non-squareness to their characteristic B-H magnetic loops; ideal operation is impossible.

Feedback controlled ferroresonant voltage regulators were then designed in an attempt to overcome these disadvantages. These systems often employed a control circuit having an RC combination in which an integrater was used to measure the volt-time area of the output voltage. A series inductor was chosen to have a value approximately equal to the value of the saturated inductor in the secondary of the ferroresonant transformer and a triac switch was used which closes when there is sufficient gate current flowing into the device. The RC combination integrates the output voltage such that the peak voltage across the capacitor at any instant is proportional to the volt-time area of the voltage at the secondary of the transformer. When the voltage at the capacitor reaches a predetermined value, gate current flows to the triac switch which conducts current and causes the capacitor to discharge and recharge in the opposite direction through the series inductor. At this time the voltage across the switch is reversed causing it to come out of conduction thus completing a half cycle. This action occurs for each half cycle with the opposite polarity. Power losses are reduced since this action cannot occur if the core saturates since the necessary volt-time area required to fire the switch cannot be obtained. But this approach still wasted power since the energy which was shunted through the series inductor was lost; the output voltage was still frequency dependent, although not to the extent that existed in a conventional C.V.T.; and voltage drops in the secondary circuit in the rectifier bridge still affected the output voltage.

More sophisticated feedback controlled ferroresonant DC voltage regulators increase the accuracy of the regulation as a function of the design of the feedback circuit. In addition, the feedback control circuit allows the value of the series inductor to be made small which allows the switch to reverse more rapidly, producing a squarer wave and reducing the required filter capacitance. Since the transformer core does not saturate, core losses are reduced and the circuit is more efficient but some loss still occurs in the series inductor shunt circuit.

Other approaches to automatic voltage regulators have employed electromechanical means wherein a solid state detector is used to control a motor drive variable transformer and a buck-boost fixed-ratio transformer is used to vary the output voltage. When the output voltage deviates from its desired value, the detector produces an error signal which causes the variable transformer drive motor to actuate and drive the auxiliary buck-boost transformer so as to cause the voltage to return to the desired level. These systems suffer severe disadvantages in the speed of correction, the accuracy of the control, and the wear and breakdown of mechanical parts.

SUMMARY OF THE INVENTION

It is an object of this invention to provide an improved regulated power supply.

It is another object of the present invention to provide an improved high efficiency voltage regulator for a power supply.

It is still another object of the present invention to provide an improved high efficiency reactive buck automatic DC voltage regulator which directly controls the rectified DC output of a loosely coupled transformer thereby providing load regulation from an unregulated alternating current source.

It is yet a further object of the present invention to provide a reactive buck automatic DC voltage regulator with improved efficiency over all regulators of comparable performance by utilizing a bilateral energy transfer technique wherein power is returned from the auxiliary buck transformer to the loosely coupled transformer rather than dissipated.

It is still a further object of the present invention to provide a high efficiency reactive buck automatic DC voltage regulator which makes the output of the power supply less frequency sensitive than normal ferroresonant power supplies; which insures that the output will not go substantially over voltage should the failure of a regulator component occur; and for providing a regulation bandwidth of below plus or minus one percent for wide variations in source voltage frequency and load.

It is yet a further object of the present invention to provide a reactive buck automatic DC voltage regulator which provides more precise regulation than is now possible in comparable series regulators with similar power handling capabilities.

It is still a further object of the present invention to provide an improved regulated power supply having a smaller and cooler running transformer and improved efficiency.

It is yet a further object of the present invention to provide a high efficiency reactive buck automatic D.C. voltage regulator with improved stability of the output to synchronously recurring line or load transients.

These and other objects and advantages of the present invention are accomplished in a regulated power supply system employing a loosely coupled transformer such as a C.V.T. having an input winding for receiving unregulated alternating current input signals; a winding having a tuned capacitor connected across it for achieving ferroresonance; and a secondary winding for supplying current to a load. The secondary winding is connected in series through the secondary of an auxiliary buck transformer and thence via rectifier means and a filter to the load. The primary of the auxiliary buck transformer is connected in series with an excitation coil which is wound about the core of the ferresonant C.V.T. transformer. A coupling network including a transistor control circuit is adjusted so as to provide the proper D.C. output voltage with a predetermined amount of bucking in the auxiliary buck transformer. As variations occur in the input voltage, frequency, or load, the amount of buck will be varied to compensate for the change so as to maintain the desired level of output voltage. The primary of the auxiliary buck transformer utilizes the technique of bilateral energy transfer to transfer energy back and forth between the buck transformer and the ferroresonant transformer so as to return excess power from the auxiliary buck transformer to the loosely coupled ferroresonant transformer thereby reducing buck power losses and maximizing efficiency. The coupling network includes a transistor control circuit employing negative feedback which establishes a predetermined reference point necessary for maintaining the desired level of output voltage. The bilateral transfer of energy between the auxiliary buck transformer and the ferroresonant transformer attempts to maintain this reference point constant and this occurs in real time so as to achieve a reactive type regulation with changes taking place through both the auxiliary buck transformer and through the ferroresonant transformer simultaneously. A feedback means is further provided to allow fine tuning of the transistor control circuit for precisely varying the established reference point in order to allow precision regulation of the D.C. output voltage.

BRIEF DESCRIPTION OF THE DRAWINGS

Other objects, advantages and features of this invention will become more fully apparent from the following detailed description, appended claims and accompanying drawings in which like reference numerals designate corresponding parts:

DETAILED DESCRIPTION OF THE DRAWINGS

Figure 1:
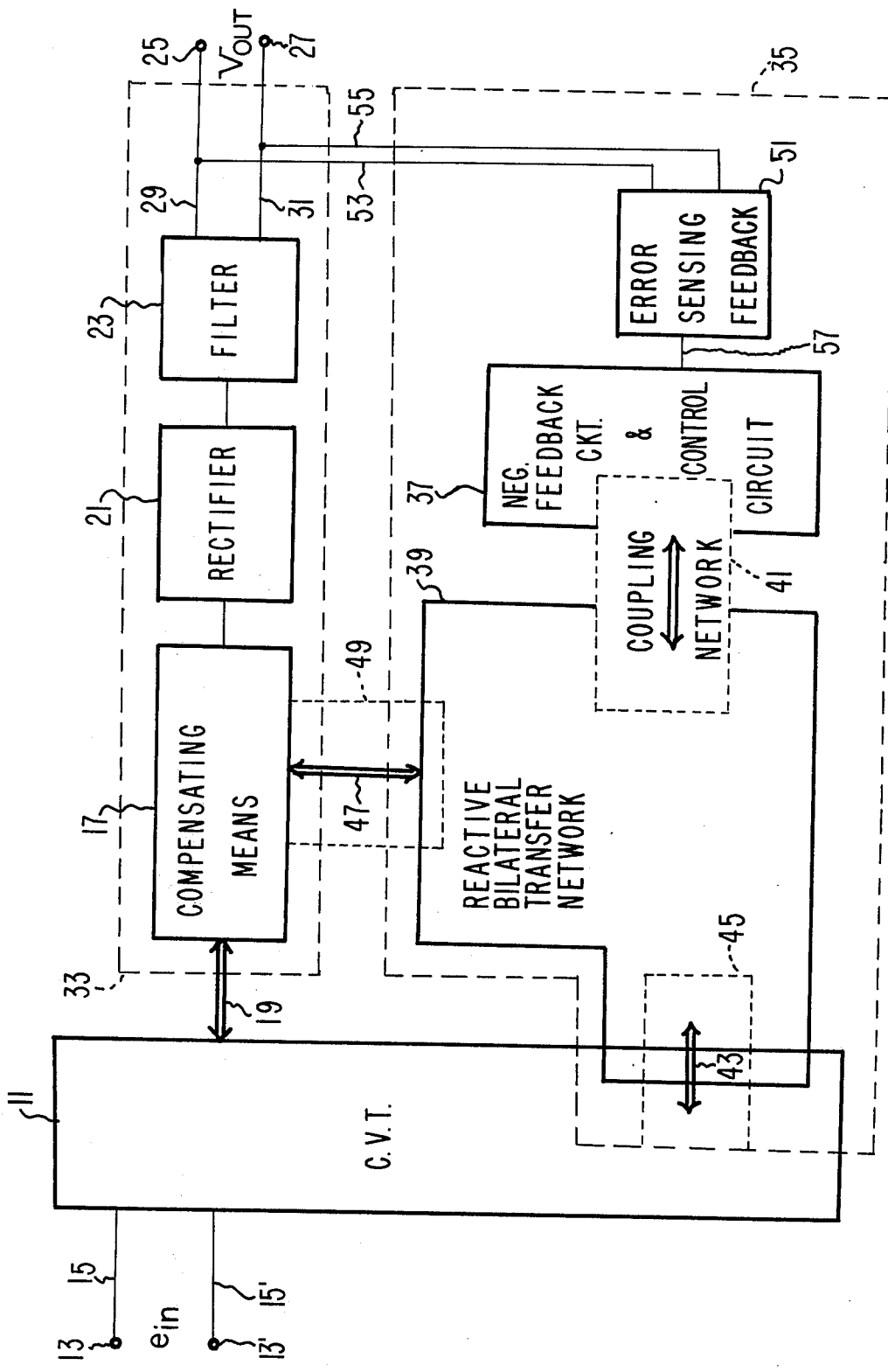
FIG. 1 is a block diagram of the high efficiency regulated power supply of the present invention.

FIG. 1 illustrates a block diagram of a high efficiency power supply incorporating the regulator of the present invention. Block 11 represents a losely coupled transformer such as a constant voltage transformer (C.V.T.), a ferroresonant transformer or the like. A pair of input terminals 13 and 13' are connected via leads 15 and 15' to the primary input winding of the ferroresonant transformer of block 11 and an unregulated source of alternating current $e_{in}$ is connected between the inputs 13, 13'. The secondary or load winding of the transformer of block 11 is coupled to the compensating means of block 17 via the coupling means illustrated by the double-arrowed lead 19. The output of the compensating means is rectified by block 21 and supplied to the input of a filter as represented by block 23. The filtered D.C. output $V_{out}$ is taken between output terminals 25 and 27 which are connected to the output of the filter of block 23 via leads 29 and 31, respectively. Dotted block 33 which encloses the compensating means of block 17, the rectifier of block 21, the filter of block 23 and output leads 29 and 31 represent the load output means coupling the load terminals 25, 27 to the load winding of the ferroresonant transformer of block 11. Dotted block 35 represents the reactive regulator control means of the present invention. A negative feedback transistor control circuit is represented by block 37 and this circuit operates on a real time basis to establish a predetermined voltage reference point which corresponds to a predetermined leve of saturation in the core of the ferroresonant transformer of block 11 which is required to produce the desired level of DC output voltage $V_{out}$ at terminals 25, 27. A reactive bilateral transfer network is respresented by block 39 and includes a coupling network represented by dotted sub-block 41. The reactive bilateral transfer network of block 39 monitors saturation in the core of the ferroresonant transformer of block 11 and transfers energy toward and away from the loosely coupled ferroresonant transformer of block 11 via the double-arrowed transfer path rrepresented by lead 43 which is enclosed within the dotted sub-block 45 and between the reactive bilateral transfer network of block 39 and the compensating means of block 17 via the double-arrowed transfer path represented by lead 47 which is enclosed within the dotted sub-block 49 of FIG. 1. The reactive bilateral transfer network of block 39 has the bilateral transfer of energy controlled by varying the coupling network of block 41 in an attempt to maintain the predetermined voltage reference point established by the negative feedback transistor control circuit of block 37. A fine-tuning effect is achieved by the error-sensing feedback circuit of block 51 whose input is taken via feedback lead 53 which connects to lead 29 at the output of the filter of block 23 and via feedback lead 55 from output lead 31 of the filter of the block 23. The output of the error-sensing feedback circuit of block 52 is supplied via lead 57 to the negative feedback transistor control circuit of block 37 and used to fine-tune or readjust the established voltage reference point in order to precisely maintain the DC output voltage constant at the desired level.

Figure 2:
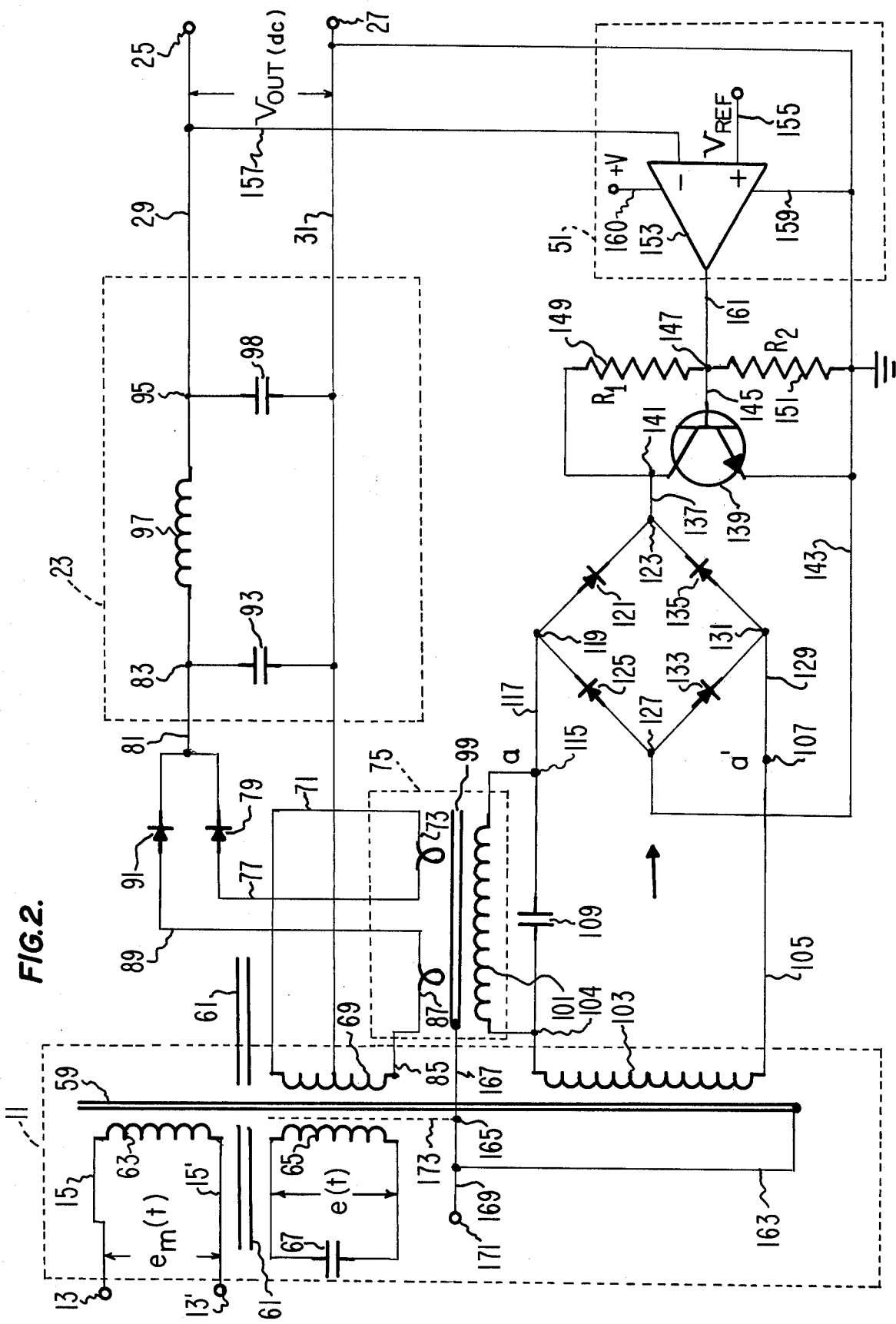
FIG. 2 is a schematic diagram of a power supply employing the reactive buck automatic D.C. voltage regulator of the present invention.

FIG. 2 shows a schematic diagram of a power supply having the reactive buck automatic D.C. voltage regulator of the present invention. The loosely coupled ferroresonant transformer is shown as being enclosed within the dotted block 11 of FIG. 2. The ferroresonant transformer has a core 59 and magnetic shunts 61. A primary coil or input winding 63 is wound about the core 59 on one side of the magnetic shunts 61. One end of the primary winding 63 is coupled via lead 15 to input terminal 13 and the opposite end of the primary winding 63 is coupled via lead 15' to input 13' such that the unregulated alternating current input signal $e_{in}$ is applied between the terminals 13, 13' and supplied to the primary input winding 63. A second winding 65 is wound about the core 59 on the opposite side of the magnetic shunts 61 and a capacitor 67 is coupled across the second winding 65. The capacitor 67 is tuned with the second winding or coil 65 for resonance at the normal input frequency such that the ferroresonance effect is achieved within the loosely coupled transformer of block 11. A secondary or load winding 69 is coupled about the core 59 on the same side of the magnetic shunts 61 as the second or ferroresonance-achieving coil 65. The center of the load winding 69 is center-tapped by a reference lead 31 which connects directly to output terminal 27. One end of the secondary or load winding 69 is coupled via lead 71 to a first secondary winding 73 of an auxiliary buck transformer which is represented as being enclosed within the dotted block 75 and the opposite end of the first secondary winding 73 of the auxiliary buck transformer 75 is connected via lead 77 to the anode of a diode 79 whose cathode is connected via lead 81 to a node 83. The opposite end of the center-tapped load winding 69 is connected via lead 85 to one end of a second secondary winding 87 of the auxiliary buck transformer 75 and the opposite end of the second secondary winding 87 is connected via lead 89 to the anode of a diode 91 whose cathode is connected via lead 81 to node 83. Node 83 is connected to the center tap reference lead 31 through a first filter capacitor 93 and to a second node 95 through a series filter inductor or choke coil 97. The second node 95 is coupled to the reference lead 31 through a second filter capacitor 98 and to output 25 via output lead 29 such that the regulated D.C. output voltage $V_{out}$ is taken between the output terminals 25 and 27 as indicated in the schematic of FIG. 2. The auxiliary buck transformer 75 further includes a core 99 and a primary auxiliary buck transformer control winding 101. The primary control winding of the auxiliary buck transformer 75 comprises one leg of the reactive bilateral transfer network of block 39 of FIG. 1. A second leg of the bilateral transfer network of block 39 comprises an excitation winding 103 which is coupled about the core 59 of the loosely coupled ferroresonant transformer of block 11 so as to be isolated from the load winding 69 to provide the necessary isolation for the control circuit of block 35. One end of the excitation winding 103 is connected directly to the primary control winding 101 of the auxiliary buck transformer 75 at node 104 and the opposite end of the excitation winding 103 is connected via lead 105 to node 107 which is also labeled ($a'$) in the schematic of FIG. 2. Node 104 is coupled through a stabilizing capacitor 109 to the opposite end of the primary control winding 101 at a node 115 and the parallel combination of the capacitor 109 and the primary control winding 101 is connected from node 104 to node 115, which is also designated as ($a$) in the schematic of FIG. 2. Node 115 is coupled via lead 117 to a first input node 119 of a full wave rectifier bridge circuit. Node 119 is coupled to the anode of a diode 121 whose cathode is coupled to a bridge output node 123 and to the cathode of a diode 125 whose anode is connected to a grounded node 127. Node 107 is connected via lead 129 to a second bridge input node 131. Node 131 is connected to the cathode of a diode 133 whose anode is connected to grounded node 127 and to the anode of a diode 135 whose cathode is connected to the bridge output node 123. The diodes 121, 125, 133 and 135, therefore, form a full wave rectifying bridge circuit, as known in the art. Node 123 is connected via lead 137 to the collector of a transistor 139 at a collector reference voltage-establishing node 141. The emitter of transistor 139 is coupled directly to a grounded lead 143 which connects to both the grounded bridge node 127 and to lead 31 at the output of the filter circuit of block 23. The base electrode of transistor 139 is connected via lead 145 to a base drive bias-establishing node 147. The bias-establishing node 147 is connected through a first negative feedback resistor 149 to the collector voltage reference-establishing node 141 at the collector of transistor 139 and through a second base-to-emitter resistor 151 to the grounded lead 143. The operating point of the control transistor 139 is established by the ratio of the feedback resistor 149 and the base-to-emitter resistor 151 and this ratio is selected to set the operating point of the control transistor 139 to maintain a predetermined collector reference voltage at which the operating flux density of the core 59 of the ferroresonant transformer of block 11 provides the predetermined desired level of DC output voltage $V_{out}$.

The error-sensing feedback system of block 51 comprises an output error amplifier 153 having a positive input connected to a source of reference potential via lead 155 and a negative input connected to output lead 29 via lead 157. The negative power supply input of the amplifier 153 is directly connected to the grounded lead 143 via lead 159; the positive power supply input is coupled to a source of positive potential via lead 160; and the output of the error amplifier is connected to the base drive bias-establising node 147 via lead 161 so as to allow precision adjustments in the operating point of the control transistor 139 in accordance with errors representing minor variations in the actual output voltage $V_{out}$ from the predetermined desired level of output voltage. The core 59 of the ferroresonant transformer is connected via shield ground lead 163 to node 165 and the core 99 of the auxiliary buck transformer 75 is connected via lead 167 to the node 165. These are the shielding leads and the node 165 is connected via lead 169 to a shield ground represented by shield ground terminal 171. The node 165 is also connected to a high energy shield 173 which may be comprised of copper foil or the like which is used to shield the high voltage coil 65 from the output or load coil 69. This shield 173 is coupled to node 165 and grounded to shield ground terminal 171 via lead 169.

In operation, the unregulated alternating current signal $e_{in}$ is supplied to the input terminals 13, 13' and fed to the primary winding 63 of the ferroresonant transformer of block 11. The second winding 65 has a capacitor connected in parallel across its terminals and this capacitor is tuned with the winding 65 to provide the ferroresonant effect. The secondary or load winding 69 is shielded from the high energy winding 65 via shield 173 and the stepped up or stepped down transformed secondary voltage appears across the winding 69. The output winding 69 is center tapped via a grounded lead 31 and its opposite ends are connected in series with the compensating secondary buck windings 73 and 87 of an auxiliary buck transformer 75. The opposite ends of the series secondary buck windings 73, 87 are connected to a pair of diodes 79 and 91 respectively, for rectification purposes, and the output is then filtered to provide the regulated DC output voltage $V_{out}$. The load current must pass through the secondary buck windings 73 and 87 of the auxiliary buck transformer and is stepped down to a much lower value in the primary control winding 101 of the auxiliary buck transformer 75. The voltage seen looking in the direction of the arrow between the terminals a-a' of the bridge rectifier comprising diodes 121, 125, 133 and 135 is that of the auxiliary buck transformer primary control winding subtracted from the voltage developed across the excitation winding 103. The absolute magnitude, ie. the rectified output of the bridge, is obtained so that a bipolar control transistor 139 can be used. The operating flux density of the ferroresonant transformer of block 11 required to produce the predetermined desired level of regulated D.C. output voltage $V_{out}$ is determined by setting the operating point of the control transistor 139 so as to maintain a predetermined level of collector voltage. In order to maintain this predetermined desired level of D.C. output voltage, the operating point of the control transistor is set by the ratio of the feedback resistor 149 and the base to emitter resistor 151. This establishes the predetermined level of reference voltage at the collector or voltage reference node 141 and the control circuit of block 35 operates by attempting to maintain the level of reference voltage at this point by varying the conductivity of the transistor 139. The peak A.C. voltage across the excitation winding 103 is directly proportional to the voltage magnitude found at the collector node 141 thereby causing bucking of the output of the voltage across the load winding 69. If the magnitude of the collector voltage at node 141 is low, a minimum of bucking or cancelling voltage is obtained across the primary winding 101 of the auxiliary buck transformer so that the transformers is connected together via a high impedance.

The stablization capacitor 109 is connected across the primary winding 101 of the auxiliary buck transformer 75 so as to reflect capacitance back into the secondary buck windings 73, 87 of the auxiliary buck transformer when there is little or no bucking action. This is necessary in order to enhance system stability since otherwise the secondary buck windings of 73, 87 appear to be series inductors to the output circuit of block 33. Conversely, under conditions of high collector voltage, the control transistor 139, via its collector-to-base feedback resistor 149 is turned on sufficiently to cause the primary of the auxiliary buck transformer to buck out the excess high output voltage. The transformers are then connected together via a control transistor circuit which looks like a low impedance and power is returned from the auxiliary buck transformer 75 to the ferroresonant transformer of block 11. All of the above takes place in real time and provides for reactive regulation with a minimum of power loss since energy is actually transferred between the auxiliary buck transformer 75 and the ferroresonant transformer of block 11 instead of being dissipated in shunt inductors, as known in the art. Additionally, feedback-controlled base drive is obtained from the output of error amplifier 153 to maintain precision control over the output voltage $V_{out}$ by varying the operating point of the transistor 139 via the level of the signal supplied to node 147 from the error amplifier 153.

The voltage across the resonant winding 65 of the ferroresonant transformer of block 11 rises to a stable value $e(t)$ as determined by the absolute magnitude of the voltage found on the collector of the control transistor 139 at the voltage reference node 141. Any change in the level of the input signal or in the supply frequency will alter the reactance of the saturable inductor 65 and caapacitor 67 thereby affecting the current circulating in the resonant circuit. Since the control system is normally bucking under all line and load conditions when the frequency is precisely at the resonant frequency of the saturable inductor 65 and capacitor 67, a frequency shift either above or below resonance simply changes the amount of bucking that takes place in a complementary manner. For low voltage or high load current, the amount of bucking decreases, and for high line voltage or low load current the amount of bucking increases. It should be noted that little power is consumed during the bucking process since power is returned from the auxiliary buck transformer secondary 73, 87 to the ferroresonant transformer of block 11 with only a small amount being dissipated in the control transistor. The reactive control is achieved via the bilateral transfer of energy between the auxiliary buck transformer 75 and the ferroresonant transformer of block 11 by the real time variations in the conductivity of the control transistor 139.

The amplitude sensing network of the present invention continually monitors, in real time, the full wave rectified sum of the primary voltage of the auxiliary buck transformer and the excitation voltage of the ferroresonant transformer and provides negative feedback so that impedance changes, as required, are effectively imposed in series with the line impedance by reflection through the ferroresonant transformer and back into series with the input winding 63. The present invention therefore provides a bilateral reactive adjustment via a bilateral transfer of energy so that both line and load variations are simultaneously compensated for with a minimum loss of power and virtually no time delay.

Figure 3:
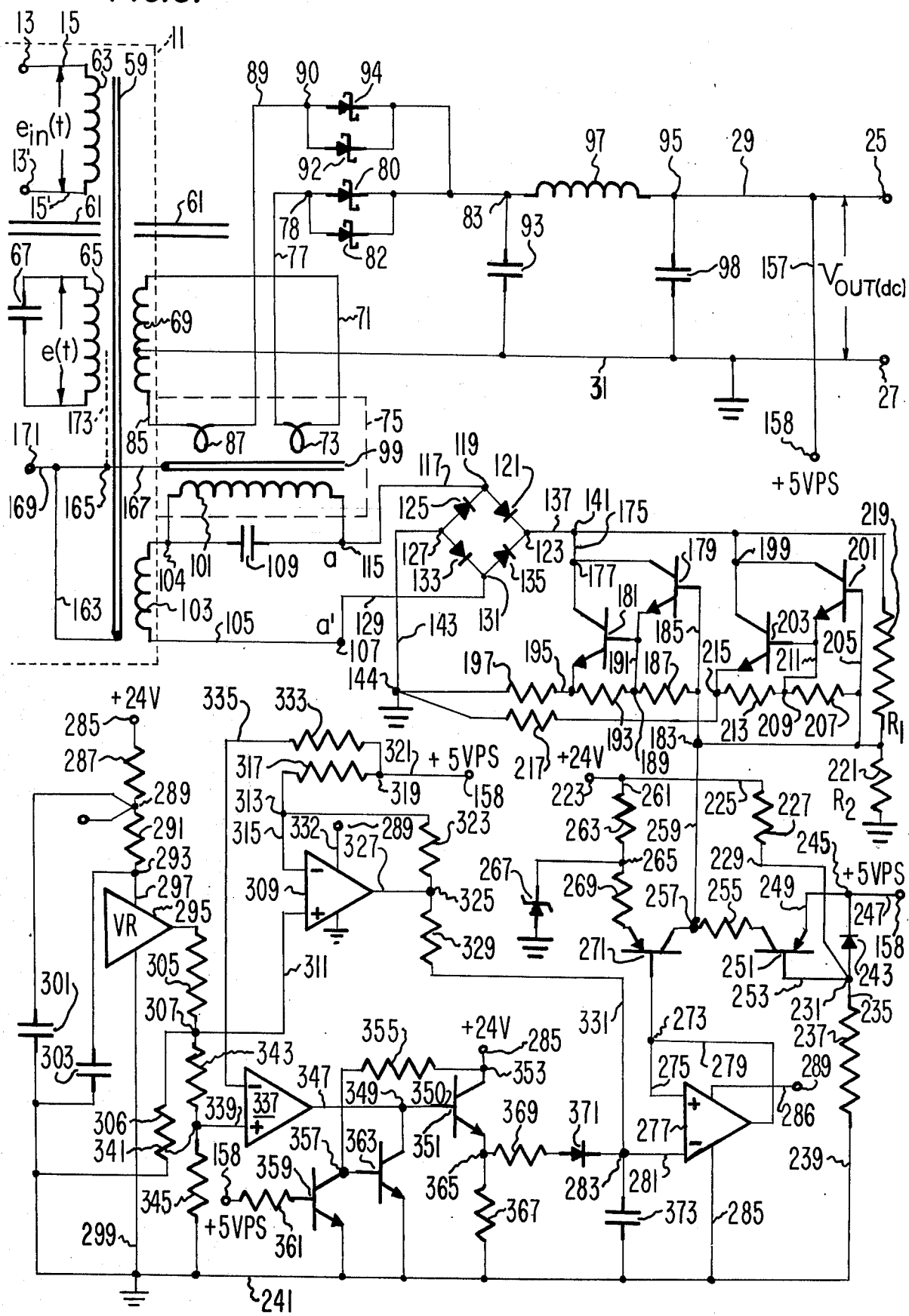
FIG. 3 is a schematic diagram of a more sophisticated power supply employing the ractive buck automatic D.C. voltage regulator of the present invention and further including additional circuitry to provide better response characteristics during turn "ON" and turn "OFF" and better overall precision regulation.

FIG. 3 illustrates a more sophisticated embodiment of the reactive buck automatic D.C. voltage regulator of the present invention wherein additional driver circuitry and error amplifiers have been added to the circuit of FIG. 2 to provide good response characteristics during the transient period when the regulator is turned "off and turned "on". In the description of FIG. 3, like reference numerals designate like circuit elements from the schematic of FIG. 2.

The ferroresonant transformer or C.V.T. is shown as being enclosed within the dotted block 11. The source of alternating current $e_{in}$ is applied between terminals 13 and 13' and supplied via leads 15 and 15' to the primary input winding 63 which is wound upon the core 59 of the ferroresonant transformer of block 11. A pair of magnetic shunts 61 separate the primary winding 63 from a second ferroresonant winding 65. A tuned capacitor 67 is connected across the second winding 65 and tuned to the input line frequency to achieve a ferroresonant effect such that the ferroresonant output voltage $e(t)$ exists across the ferroresonant winding 65. A secondary or load winding 69 is wound up the core 59 but is shielded from the high voltage ferroresonant winding 65 by a shield element 173 such as copper foil or the like. The secondary or load winding 69 is centrally tapped by a grounded lead 31 which connects the central tap to output terminal 27. One end of the load winding 69 is connected via lead 71 in series with one end of first secondary buck winding of an auxiliary buck transformer which is represented as the circuit within the dotted block 75. The opposite end of the first secondary buck winding 73 of the auxiliary buck transformer 75 is connected via lead 77 to a node 78. Node 78 is connected to a node 83 through the parallel combination of a first Schottky diode 80 and a second Schottky diode 82 each of which has its anode connected to node 78 and its cathode connected to node 83. The opposite end of the load winding 69 is connected via lead 85 to one end of a second secondary buck winding 87 of the auxiliary buck transformer 75 and the opposite end of the second secondary buck winding 87 is connected via lead 89 to a node 90. Node 90 is connected to node 83 via the parallel combination of a second pair of Schottky diodes 92 and 94 each of which has its anode connected to node 90 and its cathode connected to node 83. Node 83 serves as the input to a filter circuit and is connected via a first filter capacitor 98 to the grounded lead 31 and through a series inductor or choke coil 97 to a second filter output node 95. The second filter node 95 is connected via capacitor 97 to the grounded lead 31 and via output lead 29 to the output terminal 25 so that the regulated D.C. output voltage $V_{out}$ (D.C.) is taken between the output terminals 25 and 27 where the desired +5 volt DC output is taken. Lead 157 is connected to output lead 29 and supplies a feedback of the output voltage to the feedback terminal 158 for use elsewhere in the circuit, as hereinafter described.

The auxiliary buck transformer 75 includes a transformer core 99 and a primary control winding 101 such that the load current which passes through the secondary buck windings 73, 87 of the auxiliary buck transformer is stepped down to a much lower value in the primary control winding 101. The primary control winding 101 is connected at node 104 to one end of an excitation winding 103 which is wound about the core 59 of the ferroresonant transformer of block 11. The core 59 of ferroresonant transformer of block 11 is connected via lead 163 to a shield node 165. The shield node 165 is connected via lead 167 to the core 99 of the auxiliary buck transformer and to the shield element 173 which separates the high voltage ferroresonant winding 65 from the secondary or load winding 69, and the shield node 165 is connected via lead 169 to the shield ground terminal 171. One end of the excitation winding 103 is connected at node 104 to one end of the primary control winding 101 of the auxiliary buck transformer 75 and the other end of the excitation winding 103 is connected via lead 105 to a node 107 which is also designated as node ($a'$) in the schematic of FIG. 3. The opposite end of the primary winding 101 of the auxiliary buck transformer 75 is connected to a node 115 which is also designated ($a$) and a stabilization capacitor 109 is connected across the primary winding 101 from node 104 to node 115. Node 115 is connected to a first bridge input node 119 via lead 117 and the node 107 connects to a second bridge input node 131 via lead 129. The diode bridge comprises diodes 121, 125, 133, and 135. The first bridge input node 119 is coupled to the anode of diode 121 whose cathode is connected to a bridge output node 123 and to the cathode of a diode 125 whose anode is connected to a bridge ground node 127. The second bridge input node 131 is connected to the anode of a diode 135 whose cathode is connected to the bridge output node 123 and through the cathode of a diode 133 whose anode is connected to grounded bridge node 127. The grounded bridge output node 127 is connected via lead 143 to a grounded node 144 and the bridge output node 123 is connected via lead 137 to a reference voltage-establishing collector node 141. The collector node 141 is connected to the commonly-coupled collector node of a pair of darlington-configured control transistors. Collector node 141 is connected via lead 175 to a first commonly coupled collector node 177. The first or drive transistor 179 of the first darlington pair has its collector directly coupled to the node 177, its emitter directly coupled to the base of the second transistor 181 of the first darlington pair comprising transistors 179 and 181, and its base connected to drive input node 183 via lead 185. The base of the first transistor 179 of the first darlington pair comprising transistors 179 and 181 is connected via lead 185 and a first biasing resistor 187 to a node 189. Node 189 is connected via lead 191 to the junction of the emitter of the first transistor 179 with the base of the second transistor 181 and through a second biasing resistor 193 to a first emitter output node 195. The emitter output node is coupled to the grounded node 144 through a resistor 197 and directly to the emitter of transistor 181.

The second darlington-configured transistor pair which is coupled to the collector node 141 is connected in parallel with the first darlington-configured transistor pair 179, 181. A second commonly coupled collector node 199 is directly connected to the collector node 141 and is also connected directly to the collector of the first drive transistor 201 of the second darlington pair. The emitter of the first drive transistor 201 is directly coupled to the base of the second transistor 203 of the second darlington pair comprising transistors 201 and 203. The base of the drive transistor 201 is connected via lead 205 to the drive input node 183. A first biasing resistor 207 connects the base of the drive transistor 201 and lead 205 to a biasing node 209. The node 209 is coupled directly to the junction of the emitter of the drive transistor 201 and the base of the second transistor 203 of the second darlington pair comprising transistors 201 and 203 via lead 211 and is connected via resistor 213 to a second emitter output node 215 which is connected directly to the emitter of the transistor 203 whose collector connects directly to the commonly coupled collector node 199 of the second darlington pair comprising transistors 201 and 203. The emitter output 215 is connected to the grounded node 144 through a resistor 217. The operating point of the pair of control darlington transistors is controlled by the voltage at the bias-establishing drive input node 183. A first feedback resistor 219 has one end connected to the biasing node 183 and its opposite end connected to the collector node 141. A second biasing resistor 221 has one end connected to the biasing node 183 and its opposite end connected to ground.

A +24 volt source of control potential is provided to terminal 223. Terminal 223 is connected via lead 225 to one end of a resistor 227 whose opposite end is connected via lead 229 to an undervoltage monitoring reference node 231. The undervoltage reference monitoring node 231 is connected via lead 235 to one end of a resistor 237 whose opposite end is connected via lead 239 to a grounded lead 241. The undervoltage monitoring reference node 231 is also connected to the anode of a diode 243 whose cathode is connected to a node 245. Node 245 is connected via lead 247 to the +5 VPS feedback node 158 discussed previously. Node 245 is also connected via lead 249 to the emitter of a first base drive transistor 251 whose base is connected via lead 253 to the undervoltage monitoring node 231. The collector of transistor 251 is connected via resistor 255 to a node 257 which is connected directly to the bias-establishing base drive input node 183 via lead 259. The circuit comprising the +24 volt source of potential, resistors 227, 237, and 255, the diode 243 and the transistor 251 operates to monitor the +24 volt source of power used to supply the control circuits for undervoltage conditions such as exist at turn "on" or at turn "off". When the voltage at the junction 231 of the resistors 227 and 237 falls below the voltage on the emitter of the transistor 251 which is supplied with the feedback output voltage of terminal 158, the transistor 251 conducts and supplies drive current through resistor 255 to the bias-establishing base drive input node 183 and thence to the base drive transistors of the control darlington transistor pair so as to drive the darlington pairs and maintain the regulator in the maximum buck condition when an undervoltage condition exists. The diode 243 is included to prevent excessive reverse voltage between the base and emitter junction of the transistor 251 for protection purposes.

A portion of the error amplifier system for sensing the output voltage $V_{out}$ from feedback terminal 158 will now be described. The +24 volt terminal 223 is connected via lead 261 to one end of a resistor 263 whose opposite end is connected to node 265. Node 265 is connected to the cathode of a 15 volt zener diode 267 whose anode is connected directly to ground, and the node 265 is further connected through a resistor 269 to the emitter of a second base drive transistor 271. The collector of the transistor 271 is connected directly to the node 257 which, as previously described, connects directly to the bias-establishing base drive input node 183 via lead 259. The base of transistor 271 is connected directly to a node 273 and node 273 is connected via lead 275 to the positive input of a unity gain amplifier 277 whose output is connected back to node 273 via lead 279. The negative input of the unity gain amplifier 277 is connected via lead 281 to a negative input node 283; the negative supply input to the amplifier 277 is connected directly to the grounded lead 241 via lead 285; and the positive supply input to the amplifier 277 is connected directly to positive reference supply node 289, as hereinafter described, via lead 286. This subcircuit supplies base drive current to the darlington pairs via the biasestablishing base drive input node 183 to the base drive inputs of the control transistor pairs 179, 181 and 201, 203 respectively from the collector current of transistor 271. Transistor 271 and the combination of resistors 263 and 269 with the zener diode 267 are configured to form a current source with the emitter current of transistor 271 being determined by the voltage difference between the +15 volts established by the zener diode 267 at node 265 and the voltage at the emitter of transistor 271 divided by the value of resistor 269. The voltage on the emitter of transistor 271 is approximately 0.7 volts more positive than the voltage at its base and the voltage at its base is determined by the output of the unit gain amplifier 277 as supplied to node 273. Hence the collector current of transistor 271 is inversely proportional to its base voltage which is obtained from the output of the unit gain amplifier 277 and hence the drive current supplied to the control transistor darlington pairs is controlled by the output of the unity gain amplifier 277.

The +24 volt source of control voltage is also supplied to a second input terminal 285 which is connected via resistor 287 to a node 289 which is used to supply positive supply voltage to the supply inputs of the other amplifiers hereinafter disclosed. Node 289 is also connected through a resistor 291 to a node 293 and node 293 is connected directly to the positive supply input of a standard off-the-shelf voltage regulator 295 such as a standard 723 regulator or the like via lead 297. The negative supply input is connected directly to the grounded lead 241 via lead 299. Node 289 is connected to the grounded lead 241 through a first capacitor 301 and the node 293 is similarly connected to the ground lead 241 through a second capacitor 303. The output of the voltage regulator 295 is connected through a resistor 305 to a node 307. Node 307 is connected to the positive input of the primary error amplifier 309 via lead 311. The error amplifier may be a standard off-the-shelf 741 amplifier as known in the art. The negative input of the primary error amplifier 309 is connected to a node 313 via lead 315. Node 313 is coupled through a resistor 317 to a node 319 which is connected directly to the +5 VPS feedback node 158 via lead 321. Node 313 is also connected back through a resistor 323 to a primary error amplifier output node 325 which is connected directly to the output of the primary error amplifier 309 via lead 327. The error amplifier output node 325 is coupled to one end of the resistor 329 whose opposite end is coupled via lead 331 to node 283 which was previously described. The positive supply input of amplifier 309 is connected to the positive supply of node 289 via lead 332 and the negative supply input is directly connected to the common ground.

Node 319 which is connected directly to the +5 VPS feedback terminal 158 via lead 321 is also connected to one end of a resistor 333 whose opposite end is connected via lead 335 to the negative input of a secondary error amplifier 337 which may be a standard off-the-shelf 723 unit. The positive input of the error amplifier 337 is connected through a lead 339 to a positive input node 341 and the positive input node 341 is connected via resistor 343 to node 307 and to one end of a resistor 345 whose opposite end is connected to the grounded lead 241. Node 307 is also coupled to one end of a resistor 306 whose opposite end is connected to the grounded lead 241. The output of the secondary error amplifier 337 is connected via lead 347 to a node 349. Node 349 is connected via lead 350 to the base of a transistor 351 which forms part of the output circuitry of the error amplifier 337. The collector of transistor 351 is connected to +24 volt source of control potential via another terminal 285 via node 353 and the node 353 is coupled to one end of a resistor 355 whose opposite end is connected to a node 357. Node 357 is connected to the collector of a transistor 359 whose base is connected via resistorr 361 to the +5 VPS feedback terminal 158 and whose emitter is connected directly to the grounded lead 241. The collector node 357 is also connected directly to the base of another transistor 363 whose collector is coupled directly to node 349 whose emitter is similarly coupled directly to the grounded lead 241. The emitter of transistor 351 is connected directly to a node 365. Node 365 is connected via resistor 367 to the ground lead 241 and to one end of a resistor 369 whose opposite end is connected to the anode of a diode 371 whose cathode is connected directly to node 283 which was previously discussed. Node 283, in addition to being coupled to the negative input of the error amplifier 277 via lead 281, is coupled to the grounded lead 241 via a charging capacitor 373.

Initially, the capacitor 373 will be charged to ground potential, the output of the unit gain amplifier 277 will be near zero volts and the collector current of transistor 251 will be a maximum thereby starting the regulator in a maximum buck condition. The second error amplifier 337 is used to establish the initial conditions on the charging capacitor 373 to provide a good turn "ON" characteristic. The voltage at the node 341 which is the junction of resistors 343 and 345 establishes a reference for the second error amplifier 337 within the regulation bandwidth but slightly below the reference of the principle error amplifier 309. When the AC power is first applied, transistor 363 is in saturation and clamps the output of the second error amplifier 337 to ground potential. Transistor 363 receives its base drive via resistor 355 from the +24 power terminal 285. When the +5 volt DC output has risen to approximately one volt, transistor 359 goes into saturation and clamps the base of transistor 363 to ground. Transistor 359 receives its base drive via resistor 361 from the +5 VPS output of feedback node 158 which has risen above +1 volt. Transistor 363's collector to emitter is now in a non-conducting state and the output circuitry of the error amplifier 337 which includes transistor 351 is free to charge the capacitor 373 via resistor 369 and diode 371. The capacitor 373 is thereby charged relatively rapidly to near the steady-state operating point and well within the regulation bandwidth. At this point the principle error amplifier 309 assumes control and the capacitor 373 is now charged more slowly via resistor 329 to the steady-state operating point thereby avoiding an over-voltage transient during turn on. The second error amplifier 337 senses that no correction is required and its output falls to near ground potential thereby completing the power turn "ON" sequence. The additional driver circuitry and error amplifiers have therefore operated to provide a good response characteristic during the transient period when the regulator is turned off and turned on. The primary error amplifier 309 will hence forth operate to monitor the actual D.C. output voltage via feedback terminal 158 and control the charging of the capacitor 373 to precisely adjust the established operating point of the control darlington-configured transistor pairs.

Table I below illustrates representative component values described with reference to FIG. 3. These values are meant to be representative only and in no way constitute any limitation upon the present invention.

TABLE I

| Components | Ref. No. | Value or Designation |
|---|---|---|
| Voltage Regulators | 295 | Std. 723 VR |
| Error Amplifiers | 277, 309 | Std. 741 Amp. |
| Error Amplifier | 337 | Std. 723 Amp. |
| Darlington Pairs | 179, 181 & 201, 203 | SVT 6000 |
| Diodes | 121, 125, 133, 135, 243, 371 | IN4154 |
| Schottky Diodes | 80, 82, 92, 94 | SD51 Schottkys |
| Zener Diode | 267 | 15v, 5w Zener |
| Inductor | 97 | 130 microhenries |
| Capacitor | 93 | 1.2 farads |
| Capacitor | 97 | .6 farads |
| Capacitor | 109 | 10 microfarads |
| Capacitor | 301 | 6.8 microfarads |
| Capacitor | 303 | 0.1 microfarads |
| Capacitor | 373 | 47 microfarads |
| Resistors | 197, 217 | .5 ohms |
| Resistor | 219 | 1500 ohms |
| Resistor | 221 | 47 ohms |
| Resistors | 263, 269 | 200 ohms |
| Resistor | 227 | 3000 ohms |
| Resistors | 237, 333, 343 & 367 | 1000 ohms |
| Resistor | 255 | 20 ohms |
| Resistor | 287 | 22 ohms |
| Resistor | 291 | 2.7 ohms |
| Resistor | 305 | 1680 ohms |
| Resistor | 306 | 5050 ohms |
| Resistor | 317 | 1300 ohms |
| Resistor | 323 | $1\times10^6$ ohms |
| Resistor | 329 | 402,000 ohms |
| Resistor | 345 | 48,700 ohms |
| Resistor | 355 | 22,000 ohms |
| Resistor | 361 | 4700 ohms |
| Resistor | 369 | 15,000 ohms |

Although specific apparatus has been shown for the purpose of describing applicants' invention, it will be apparent to those skilled in the art that other variations and modifications in the specific structure illustrated may be made without departing from the spirit and scope of the present invention which is limited only by the appended claims.

We claim:

1. A high-efficiency regulated power supply comprising:
    ferroresonant transformer means for transforming an alternating current input signal, said ferroresonant transformer means including a core means, a primary input coil means coupled about said core means for receiving said alternating current input signal, a secondary coil means coupled about said core means and responsive to the alternating current input signal received by said primary coil means for generating a transformed secondary signal, a third coil means coupled about said core means and including a capacitor means connected in parallel across said coil means and tuned with said third coil means near the input frequency of said alternating current input signal for establishing ferroresonant and a centrally tapped winding within said secondary coil means having a central tap lead coupled to ground wwith one end of said centrally tapped secondary winding being serially connected to a first buck transformer secondary winding means and the other end of said centrally tapped secondary winding being serially coupled to a second buck transformer secondary coil means;

output means coupled to said secondary coil means for receiving said transformed secondary signal and outputting a regulated DC output signal, said output means including compensation means for varying said transformed secondary signal to ensure that said regulated DC output signal remains constant, said compensation means includes an auxiliary buck transformer means having a buck transformer secondary winding means connected in series with said secondary coil means for controllably bucking said transformed secondary signal and a buck transformery primary control winding means for controlling the amount of buck produced by said buck transformer secondary winding means, and said output means further includes an LC filter network for producing a DC output signal and rectifying diode means for coupling said buck transformery secondary winding means to said output filter means; and reactive control means responsive to real time changes in the alternating current input signal, in the parameters of the power supply itself, and in the load for simultaneously and rectively controlling said compensating means, said alternating current input signal and said transformed secondary signal for ensuring that said regulated DC output signal remains constant while minimizing power losses within said power supply.

2. In a power supply having a ferroresonant transformer including an input primary winding for receiving an input signal, a load winding for transforming said input signal having a centrally tapped coil with a grounded central tap, means for rectifying the transformed signal and filter means for providing a DC output signal, an improved automatic high efficiency regulator comprising:

an auxiliary buck transformer means for variably bucking said transformed signal to maintain said DC output signal constant, secondary buck transformer winding means for bucking said transformed signal, means for coupling said secondary buck transformer winding means in series between said load winding and said rectifying means, primary buck transformer control winding means for controllably varying the amount of buck produced in said secondary buck transformer winding means, first secondary buck transformer winding means connected in series between one end of said centrally tapped load winding and said rectifying means and a second secondary buck transformer winding means coupled in series between the opposite end of said centrally tapped load winding and said rectifying means and wherein said auxiliary buck transformer means further includes a primary transformer control winding for controllably varying the amount of buck in said first and second secondary buck transformer winding means for controllably varying said transformed signal in response to the energy stored in said primary control winding means; and bilateral reactive adjustment means for controllably varying on a real time basis the bucking of said transformed signal by said auxiliary buck transformer means to compensate for both line and load variations without significant power losses.

3. A high-efficiency regulated power supply comprising:

ferroresonant transformer means for transforming an alternating current input signal, said ferroresonant transformer means including a core means, a primary input coil means coupled about said core means for receiving said alternating current input signal, a secondary coil means coupled about said core means and responsive to the alternating current input signal receiving by said primary coil means for generating a transformed secondary signal, and a third coil means coupled about said core means and including a capacitor means connected in parallel across said coil means and tuned with said third coil means near the input frequency of said alternating current input signal for establishing ferroresonance;

output means coupled to said secondary coil means for receiving said transformed secondary signal and outputting a regulated DC output signal, said output means including compensation means for varying said transformed secondary signal to ensure that said regulated DC output signal remains constant said compensation means includes an auxiliary buck transformer means having a buck transformer secondary winding means connected in series with said secondary coil means for controllably bucking said transformed secondary signal and a buck transformer primary control winding means for controlling the amount of buck produced by said buck transformer secondary winding means; and reactive control means responsive to real time changes in the alternating current input signal, in the parameters of the power supply itself, and in the load for simultaneously and reactively controlling said compensating means, said alternating current input signal an said transformed secondary signal for ensuring that said regulated DC output signal remains constant while minimizing power losses within said power supply said reactive control means including negative feedback means for establishing a predetermined operating point which corresponds to the amount of flux density in said core means required to produce the desired level of regulated DC output voltage, excitation winding means coupled about said core means of said ferroresonant transformer means for monitoring the flux density in said core means, and control circuit means for coupling said excitation winding means in a series control loop with said primary control winding means of said auxiliary buck transformer means, said control means being responsive to variations in said alternating current input signal, in the parameters of the power supply itself and in the load for varying the coupling between said excitation winding means and said primary control winding means to bilaterally transfer energy between said auxiliary buck transformer means and said ferroresonant transformer means in order to maintain said predetermined established operating point constant.

4. The regulated power supply of claim 3 wherein said control circuit means includes a second capacitor means coupled in parallel across the primary control winding means of said auxiliary buck transformer means for reflecting capacitance into said buck transformer secondary winding means to enhance the stability of the power supply under conditions of little or no bucking action.

5. The regulated power supply of claim 3 wherein said reactive control means further includes feedback means responsive to the actual level of said regulated DC output signal for sensing deviations from the desired level of regulated DC output signal and for precisely altering the predetermined established operating point in response thereto for ensuring that said regulated DC output signal remains constant.

6. The regulated power supply of claim 3 wherein said control circuit means comprises:
a full wave rectifier bridge means for rectifying the signals present on said excitation winding means and on the buck transformer primary control winding means, said full wave rectifier bridge means including a pair of bridge inputs, a grounded bridge output and a primary bridge output;
means for connecting a first end of said excitation winding means to a first end of said buck transformer primary control winding means;
means for coupling the opposite end of said buck transformer primary control winding means to one input of said full wave rectifier bridge means;
means for coupling the opposite end of said excitation winding means to the other input of said full wave rectifier bridge means;
control transistor means having a base electrode, a collector electrode, and an emitter electrode;
means for coupling the emitter of said control transistor to the grounded output of said full wave rectifier bridge means; and
means for coupling the primary output of said full wave rectifier bridge means to the collector of said control transistor means such that the rectified output of said full wave rectified bridge means is supplied to the collector of said control transistor means and wherein said negative feedback means includes a first resistor coupled between the base and the emitter of said control transistor means and wherein a feedback resistor is coupled between the base and the collector of said control transistor means for establishing the predetermined operating point of said control transistor means, said control transistor functioning to vary its conductivity to vary the coupling between said excitation winding means and said buck transformer primary control winding means to bilaterally transfer energy between said auxiliary buck transformer means and said ferroresonant transformer means in such a manner as to maintain said predetermined operating point at the desired level thereby maintaining constant said desired level of DC output signal.

7. The regulated power supply of claim 6 wherein said negative feedback means includes an output error amplifier means having one input connected to a predetermined reference signal and another input connected to the output of said filter means for monitoring said actual regulated DC output signal, said output error amplifier means having its output coupled to the base of said control transistor means for precisely varying said predetermined established operating point to maintain constant said desired level of regulated DC output signal.

8. The regulated power supply of claim 3 wherein said control circuit means comprises:
means for serially coupling one end of said excitation winding means to one end of said buck transformer primary control winding means;
full wave bridge rectifier means having one input coupled to the opposite end of said buck transformer primary control winding means and the other input coupled to the opposite end of said excitation winding means;
control transistor means coupled to the output of said full wave bridge rectifier means, said control transistor means having a base drive electrode for controlling the conduction of said control transistor means;
negative feedback means coupled to said base electrode means for establishing a predetermined operating point for said control transistor means;
means coupled to said base electrode means for monitoring for undervoltage conditions during the turn-on and turn-off of the power supply and responsive to said undervoltage condition for supply drive current to said base electrode for ensuring a maximum buck condition in said auxiliary buck transformer means so long as said undervoltage condition exists; and
error amplifier sensing means responsive to the actual regulated DC output signal for varying the drive current supplied to said base electrode so as to control the bilateral transfer of energy between said auxiliary buck transformer means and said ferroresonant transformer means to maintain said regulated DC output signal at said desired level while avoiding overvoltage transient conditions during the turn-on of the power supply.

9. The regulated power supply of claim 8 wherein said error amplifier sensing means comprises:
unity gain amplifier means;
first drive means coupled to the output of said unit gain amplifier means for providing drive current to the base electrode of said control transistor means in response to the output of said unit gain amplifier means;
charging capacitor means coupled to the input of said unity gain amplifier means controlling the output of said unity gain amplifier means in proportion to the charge stored on said charging capacitor means;
first error amplifier means for establishing the initial conditions on said charging capacitor means during the turn-on of said power supply such that said charging capacitor means is initially charged to ground potential and then quickly charged by the output of said first error amplifier means to a first predetermined level of charge which causes the output of said unity gain amplifier means to rise to a point near but below the steady state operating point of the regulator; and
a second error amplifier means for assuming control of the charging of said charging capacitor means when said first predetermined level of charge is attained and for more slowly charging said capacitor until said steady state operating point is reached thereby avoiding overvoltage transients during the turnon of the power supply, said second error amplifier means having an input coupled to the output of said regulated power supply for feeding back the actual regulated DC output signal to one input of said second error amplifier means, having a second input coupled to a source of reference potential representative of the desired level of regulated DC output signal such that the output of said second error amplifier means varies the charge on said charging capacitor means for varying the drive signal to the base of said control transistor means and varying said established predetermined operating point thereby controlling the transfer of energy between said auxiliary buck transformer and said ferroresonant transformer means to restore the output of the power supply to the desired constant level.

10. In a power supply having a ferroresonant transformer including an input primary winding for receiving an input signal, a load winding for transforming said input signal, means for rectifying the transformed signal and filter means for providing a DC output signal, an improved automatic high efficiency regulator comprising:
  an auxiliary buck transformer means for variably bucking said transformed signal to maintain said DC output signal constant, secondary buck transformer winding means for bucking said transformed signal, means for coupling said secondary buck transformer winding means in series between said load winding and said rectifying means, and primary buck transformer control winding means for controllably varying the amount of buck produced in said secondary buck transformer winding means; and
  bilateral reactive adjustment means for controllably varying on a real time basis the bucking of said transformed signal by said auxiliary buck transformer means to compensate for both line and load variations without significant power losses, means coupled about the core of said ferroresonant transformer for monitoring the magnetic flux therein, means for coupling said monitoring means in a series path with the primary control winding of said auxiliary buck transformer means, and control means responsive to variations in said input signal or said output signal for controlling the bilateral transfer of energy between said auxiliary buck transformer and said ferroresonant transformer for maintaining a constant predetermined desired level of output signal.

11. The improved regulator of claim 10 wherein said bilateral reactive adjustment means further includes capacitor means coupled in parallel across the primary control winding of said auxiliary buck transformer means for reflecting capacitance into said secondary buck transformer winding means for improved regulator stabilization.

12. The improved regulator of claim 10 wherein said control means comprises:
  control transistor means for varying its conduction in response to the value of a control drive signal at its base;
  means for coupling said serially connected monitoring means and said primary control winding with said control transistor means to form a control loop; and
  negative feedback means for driving said control transistor means and maintaining a predetermined collector voltage, said predetermined collector voltage corresponding to that level of magnetic flux in the core of said ferroresonant transformer necessary to produce the predetermined desired level of DC output signal at the output of said power supply, said negative feedback means operating to vary the conductivity of said control transistor means to transfer energy between said auxiliary buck transformer means and said ferroresonant transformer so as to maintain said predetermined collector voltage constant.

13. The improved regulator of claim 12 wherein said bilateral reactive adjustment means further includes output feedback error sensing means responsive to deviations in said actual DC output signal from a predetermined desired level of DC output signal for fine-tuning the operating point of said control transistor means by varying the drive signal at the base of said control transistor means and hence varying the transfer of energy between said auxiliary buck transformer means and said ferroresonant transformer in order to restore said DC output signal to said predetermined desired level.

14. The improved regulator of claim 13 wherein said bilateral reactive adjustment means further includes means coupled to the base of said control transistor means for ensuring good regulator response characteristics when the regulator is turned-on and turned-off.

15. In a regulated supply having a loosely coupled transformer for receiving an input signal and a secondary load circuit means for receiving a transformed load circuit signal and outputting a DC output signal, an improved automatic regulator comprising:
  an auxiliary buck transformer including a secondary winding means in series with said secondary load circuit means for variably bucking said transformed load circuit signal to maintain said DC output signal constant, said auxiliary buck transformer also including a primary control winding;
  control circuit means for establishing an operating point corresponding to a predetermined desired level of flux density in said loosely coupled transformer which is required to maintain a desired level of said constant DC output signal; and
  bilateral reactive means including an excitation winding means coupled to said loosely coupled transformer for monitoring the flux density in said loosely coupled transformer and means for automatically controlling the high efficiency bilateral transfer of energy between the auxiliary buck transformer and said loosely coupled transformer to maintain said established operating point, means for serially coupline one end of the primary control winding of said auxiliary buck transformer to one end of said excitation winding means, a capacitor coupled in parallel across the primary control winding of said auxiliary buck transformer for reflecting capacitance into the secondary winding of said auxiliary buck transformer for improving the stability of said regulator, means for coupling the opposite end of the primary control winding of said auxiliary buck transformer and the opposite end of said excitation winding means to said control circuit means, said coupling means including a full wave rectifier bridge having one input coupled to the opposite end of the primary control winding of said auxiliary buck transformer and a second input coupled to the opposite end of said excitation winding means, control transistor means having its collector coupled to the output of said full wave rectifier bridge for supplying the rectified output of said bridge to the collector of said control transistor means, said control transistor means further including a base drive electrode for controlling the conductivity of said control transistor means, and wherein said control circuit means for establishing said operating point includes a first resistor means coupled between said base drive electrode and the emitter of said control transistor means and a negative feedback resistor coupled between said base drive electrode and the collector of said control transistor means for establishing said operating point and controlling the conductivity of said control transistor means in response to said established operating point so as to bilaterally transfer energy between said auxiliary buck transformer and said loosely coupled transformer so as to maintain said established operating point thereby maintaining said desired level of constant DC output signal.

16. The improved automatic regulator of claim 15 wherein said control circuit means further includes error sensing feedback means coupled to the output of said power supply for monitoring said DC output signal and precisely adjusting said operating point to control said bilateral transfer of energy so to precisely maintain said desired level of DC output signal constant.

17. The improved automatic regulator of claim 16 wherein said error sensing feedback means comprises:
    means for coupling a source of control power to said error sensing feedback means for turning said automatic regulator on and off;
    means for monitoring said power coupling means for sensing when the voltage developed by said source of control power falls below a predetermined value;
    means responsive to said voltage sensing means for supplying maximum drive current to said base drive electrode for maintaining the regulator in the maximum buck condition when the voltage developed by said source of control power falls below said predetermined value indicating that the regulator has just been turned on or off;
    second means for supplying drive current to the base drive electrode of said control transistor means;
    means for controlling the amount of drive current supplied by said second drive current supply means, said controlling means including a capacitive means for storing a charge such that the stored charge is inversely proportional to the amount of drive current supplied by said second drive current supplying means;
    first error amplifier means responsive to the feedback of said DC output signal from the output of said regulated power supply for initially controlling the rapid charging of said capacitor means for providing a good turn on characteristic; and
    second error amplifier means responsive to the feedback of said DC output signal from the output of said regulated power supply for assuming the control of the charging of said capacitor means when the charge stored on said capacitor means has reached the predetermined level of charge relatively near but below the steady-state operating point of the system for more slowly controlling the charging of said capacitor means near the steady-state operating point of said system in response to the feedback of said DC output signal and the predetermined desired level of said DC output signal thereby precisely varying the operating point of said control transistor means to maintain said desired constant level of DC output signal.

18. A ferroresonant voltage regulating circuit comprising:
    a constant voltage transformer means including a core, an input winding means for receiving an AC input voltage, an isolated winding means and an output winding means for receiving a transformed AC secondary voltage;
    a first capacitor means connected across said isolated winding means and tuned to the line frequency of the AC input voltage signal for establishing a ferroresonant circuit;
    an isolated excitation winding means coupled to said core for monitoring the flux density therein;
    an auxiliary buck transformer means including a secondary buck winding means connected in series with said output winding means for variably bucking said transformed AC secondary voltage to maintain a predetermined desired level of output voltage and a primary control winding means connected in series with said isolated excitation winding means for controllably varying the amount of buck in said secondary buck winding means; and
    control means including negative feedback means for establishing a predetermined operating potential corresponding to a predetermined level of flux density in said core which is required to produce said predetermined desired level of output voltage, said control means further including means for variably coupling said isolated excitation winding means and the primary winding means of said auxiliary buck transformer means for effecting the bilateral transfer of energy between said auxiliary buck transformer means and said constant voltage transformer means in order to maintain the established predetermined operating potential required to maintain said predetermined desired level of constant output voltage.

19. The ferroresonant voltage regulating circuit of claim 18 wherein said control means includes:
    control transistor means in said variable coupling means for controllably varying said coupling and effecting said bilateral transfer of energy in order to maintain said established predetermined operating potential;
    negative feedback means for establishing said predetermined operating potential at the base of said control transistor means for controllably driving said control transistor means in order to maintain said established predetermined operating potential constant; and
    feedback means coupled to the base of said control transistor means for precisely adjusting said established predetermined operating potential in order to maintain said predetermined desired level of constant output voltage.

* * * * *